UNITED STATES PATENT OFFICE.

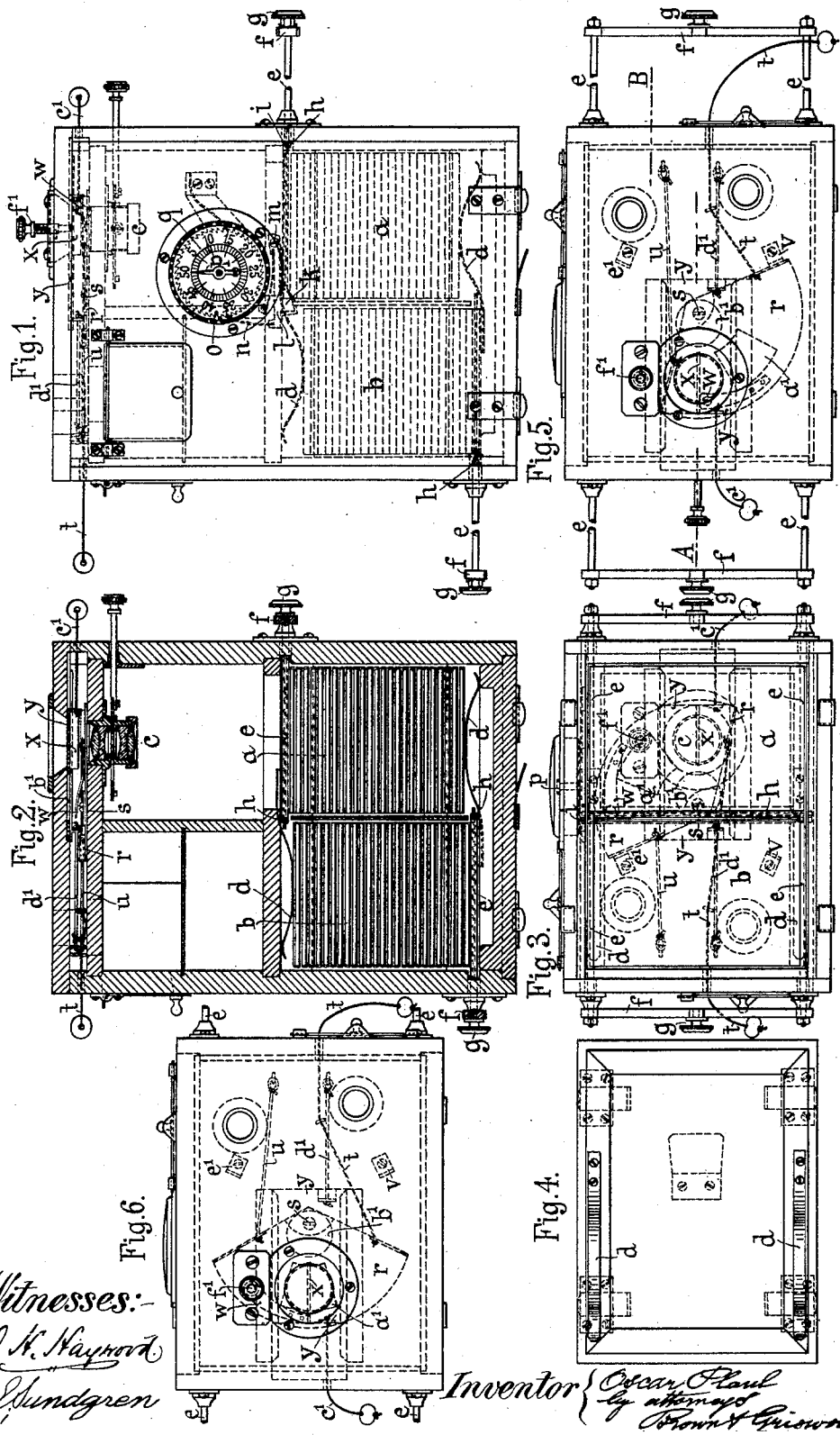

OSCAR PLAUL, OF DRESDEN, GERMANY, ASSIGNOR TO HUGER & HOFFMANN, OF SAME PLACE.

PHOTOGRAPHIC CAMERA.

SPECIFICATION forming part of Letters Patent No. 434,090, dated August 12, 1890.

Application filed January 6, 1890. Serial No. 335,991. (No model.) Patented in France August 7, 1889, No. 200,062, and in Belgium August 7, 1889, No. 87,294.

*To all whom it may concern:*

Be it known that I, OSCAR PLAUL, of the city of Dresden, in the Kingdom of Saxony, in the German Empire, have invented certain new and useful Improvements in Photographic Cameras, (for which I have obtained Brevets d'Invention in France, No. 200,062, and in Belgium, No. 87,294, both dated August 7, 1889,) of which the following is a specification.

This invention relates more particularly to photographic cameras in which two chambers are established by means of a partition-wall, both chambers being completely filled with sheathed plates, and the sheathed plates being exchanged, transferred, or shifted by means outside the camera from one chamber to the other, so that all the plates of the entire set in the camera will come each in its turn in that position opposite to the objective, in which it may be exposed to light.

An important feature of my invention consists in the form or construction of the shifter by means of which the plates are shifted from one chamber of the camera to the other, said shifter being of such form that it may be or remain within the camera before the very plate which is to be exposed to light without interfering with the exposure of said plate. By this kind of shifter I am enabled to allow the plate to be exposed and afterward to be shifted into the adjacent chamber, whence a plate may be shifted by a shifter of similar form or construction into the first-named chamber, to come in its turn opposite to the objective. This is a special advantage over cameras heretofore made, as in my camera if a plate has been exposed and the same has been shifted into the adjacent chamber there is immediately the following plate in the right position to be exposed at every moment. In other words, the chamber which corresponds with the objective is always entirely or partly filled with plates ready for exposure, whereas in other cameras the plate had to be shifted into the position opposite the objective in order to be exposed. This is especially due to the form which I have given to my shifter.

Another feature of my invention is a dial arranged with its face and its finger on the outside of the camera, the dial being divided into as many marks or divisions as the camera is capable of containing plates, and the finger of said dial being moved by the shifter whenever the latter shifts the plate that has been exposed into the adjacent chamber, so that if an exposed plate is shifted the finger is moved from one mark of the dial to another, thus indicating in an automatic manner the number of plates which have already been exposed. By these means the operator will be enabled to readily ascertain how many plates are left unexposed within the camera.

Another feature of my invention consists in means for using the shutter of the objective for both cases—viz., for momentary and for time exposure. For this purpose the shutter is composed of two parts acting or being acted in coincidence. One of these parts is a segment pivoted to swing in a vertical plane and provided with an opening or aperture, the said segment for time exposure being brought into a fixed position, so that its aperture corresponds with the objective, whereas for the momentary exposure it is caused to swing on its pivot at a moment during which its aperture will pass the objective. The other part is a sliding shutter sliding in a horizontal direction, and which has also an aperture, the said sliding shutter for time exposure being drawn so that its aperture will come in corresponding position with the objective and the aperture in the segment, and being kept in this position for any length of exposure, whereas the said shutter for momentary exposure is drawn to bring its aperture in corresponding position with the objective, the segment-shutter which covers the objective being at this moment relieved by the sliding shutter, so that the aperture of the segment-shutter passes the objective in a moment's time. Both the segment and the sliding shutter are provided with spring devices for their instantaneous action, and also with cords for their handling from outside the camera.

Now in order that my improved camera may be fully understood, I will describe the same with reference to the annexed drawings, in which—

Figure 1 is a top view of a camera embodying my invention. Fig. 2 is a horizontal section of the same, taken nearly in the lines A B, Fig. 5. Fig. 3 is a rear end view of the same. Fig. 4 is an inside face-view of a detachable cover for the rear end. Fig. 5 is a front view of the camera with the shutter in position ready for momentary exposure. Fig. 6 is a front view of the same with the shutter in position ready for time exposure.

Similar letters of reference designate corresponding parts in all the figures.

The camera is divided into two chambers $a$ and $b$, the chamber $a$ being opposite the objective $c$, both chambers being capable of being completely filled with plates—say fifty *in toto* in the present case—each set of twenty-five plates being under the action of springs $d$, two of which are arranged at opposite ends of each set. There are two shifters provided, each shifter forming a closed square frame consisting of the two parallel rods $e\ e$, connected outside the camera by a cross-bar $f$, provided with a button or handle $g$, and connected inside the camera by a cross-bar $h$, the latter having small projections for sliding in suitable guides within the camera. Such shifter may be within the camera during the exposure of the plate opposite the objective, and with its parallel rods $e\ e$ and cross-bar $h$ above the plate, as shown in Figs. 2 and 3, and it will not interfere with the focus. If the exposure has come to an end, the shifter opposite the objective may be withdrawn in the outward direction, making room for the exposed plate to advance with all the plates in this chamber $a$ under the action of the springs $d$. The first or exposed plate will now be in front of or level with the shifter, which if pushed into the camera will push the exposed plate into the chamber $b$ against the action of springs $d$ in that chamber. The next plate will be then ready for exposure. The shifter of the chamber $b$ being of the same form as that of the chamber $a$, acts in the same manner as described for pushing the plates from the chamber $b$ into the chamber $a$; but of course the form of shifter in this instance is not of such vital importance as that of the shifter opposite the objective. While pushing in the shifter which is opposite the objective, in order to bring the exposed plate from chamber $a$ to chamber $b$, a pin $i$, protruding from one side of the parallel rod $e$, has been brought against the nose $k$ of a lever $l$, which lever swings on a pivot $m$ and is provided with a pawl $n$, taking into a ratchet-wheel $o$, on the axle of which the index-finger $p$ is fixed. It is evident that with every inward push of the shifter the finger $p$ will move one step, thus indicating on the dial $q$ the number of plates that have been exposed. It is obvious, however, that the arrangement of the index-finger and dial may be such as to indicate the number of plates remaining unexposed, and that in either case the operator is enabled to readily ascertain the state of the plates in the camera.

I will now describe the arrangement of the shutter of the objective with reference to Fig. 5, in which the shutter is shown in position ready for momentary exposure. The segment-shutter $r$ is pivoted on a pin $s$ within the front part of the camera and is capable of being swung to the position shown in Fig. 5 by pulling of a cord $t$ against the tension of a rubber spring $u$ until arrested by the stop $v$. The shutter $r$ is kept in this position by the steel-blade detent-spring $w$, which is attached to it, taking behind the bar $x$ of the horizontally-sliding shutter $y$. In this position neither the square aperture $a'$ of the segment-shutter $r$ nor the round aperture $b'$ of the sliding shutter $y$ is *vis-a-vis* of the objective. If now the sliding shutter $y$, with its bar $x$, is drawn by the cord $c'$ against the action of its rubber spring $d'$ so far that its aperture $b'$ is in line with the objective the latter is still covered by the segment-shutter $r$; but in the next instance of the horizontal movement of sliding shutter $y$ the spring $w$ becomes relieved from the bar $x$, and the segment-shutter will immediately follow the traction action of its rubber spring $u$, bringing its aperture $a'$ for a fraction of a moment in correspondence with the objective, which suffices for exposure of the plate, the segment-shutter being arrested by the stop $e'$. As soon as these actions have been performed the cord $c'$ may be released for the sliding shutter $y$ to take its initial position under the action of the rubber spring $d'$. Afterward the segment-shutter is drawn back by the cord $t$ against the rubber spring $u$ until the steel spring $w$ takes behind the bar $x$ of the sliding shutter $y$, the parts being thus made ready for new momentary exposure. In order, however, to use the above-named parts—viz., the segmental shutter $r$ and the sliding shutter $y$—for time exposure—that means exposure for a given period of time—the following means are applied: The steel-blade spring $w$, above referred to, of the segment-shutter $r$ has a hole bored near its free end. A screw $f'$ may be screwed into the wall of the camera so far that if the segment-shutter $r$ is drawn by means of the cord $t$ against the action of the rubber spring $u$ the end of the screw $f'$ will take into the hole of the blade-spring $w$, thus fixing the segment-slide $r$, the aperture $a'$ of which will face in this position the objective $c$. Now the sliding shutter $y$ may be drawn by its cord $c'$ against the action of the rubber spring $d'$ until its aperture $b'$ faces the objective, and this position may be maintained for any required period of time, this period being terminated by releasing the cord $c'$ for the retiring of the sliding shutter $y$ by means of rubber spring $d'$.

By the means hereinabove described the segment-shutter r and the sliding shutter y may be used in connection for momentary and for time exposure.

I claim in photographic cameras in which two chambers are arranged for the reception of plates—

1. The combination, with a camera having two chambers adapted to be both filled with plates, of two shifters, the one for shifting an exposed plate from one chamber into a second chamber, and the other shifter for shifting a plate from the said second chamber into the first chamber, and means for operating both shifters from outside the camera, the said shifters being constructed to cover the rims of the plates only, whereby the plate or plates to be exposed may be arranged before exposure within the chamber which faces the objective, and may be shifted after exposure into an adjacent chamber, substantially as set forth.

2. The combination, with the camera having two chambers and the shifter for pushing the plate into the adjacent chamber after exposure in the chamber opposite the objective, of the dial $q$, finger $p$, lever $l$, pawl $n$, and ratchet-wheel $o$ for indicating the number of plates in either chamber of the camera, substantially as herein set forth.

3. The combination, with the camera having two chambers, one of which faces the objective, and a shifter for shifting plates from the one of said chambers to the other, of the shutter consisting of a pivoted segment part $r$, capable of moving in a vertical plane, and a sliding part $y$, capable of moving in a horizontal direction, said parts $r$ and $y$ being provided with cords for handling and springs for returning them, and with apertures, each capable of corresponding with the objective $c$, substantially as and for the purpose herein set forth.

4. In combination with the shutter composed of the segment part $r$ and sliding part $y$, the blade-spring $w$ on the said part $r$ and the bar $x$ on the said part $y$, the blade-spring $w$ taking behind the said bar $x$ to keep the shutter parts in position for momentary exposure, substantially as herein described.

5. The combination with the camera and the shutter consisting of the segment part $r$ and sliding part $y$, of the blade $w$, attached to said segment part, and the set-screw $f'$, screwed into the wall of the camera for keeping the shutter part $r$ in position for time exposure, substantially as herein set forth.

In testimony that I claim the foregoing as my invention I have signed my name in presence of two subscribing witnesses.

OSCAR PLAUL.

Witnesses:
WILHELM WIESENHÜTTER,
GEORGE RICHTER.